No. 752,200. Patented February 16, 1904.

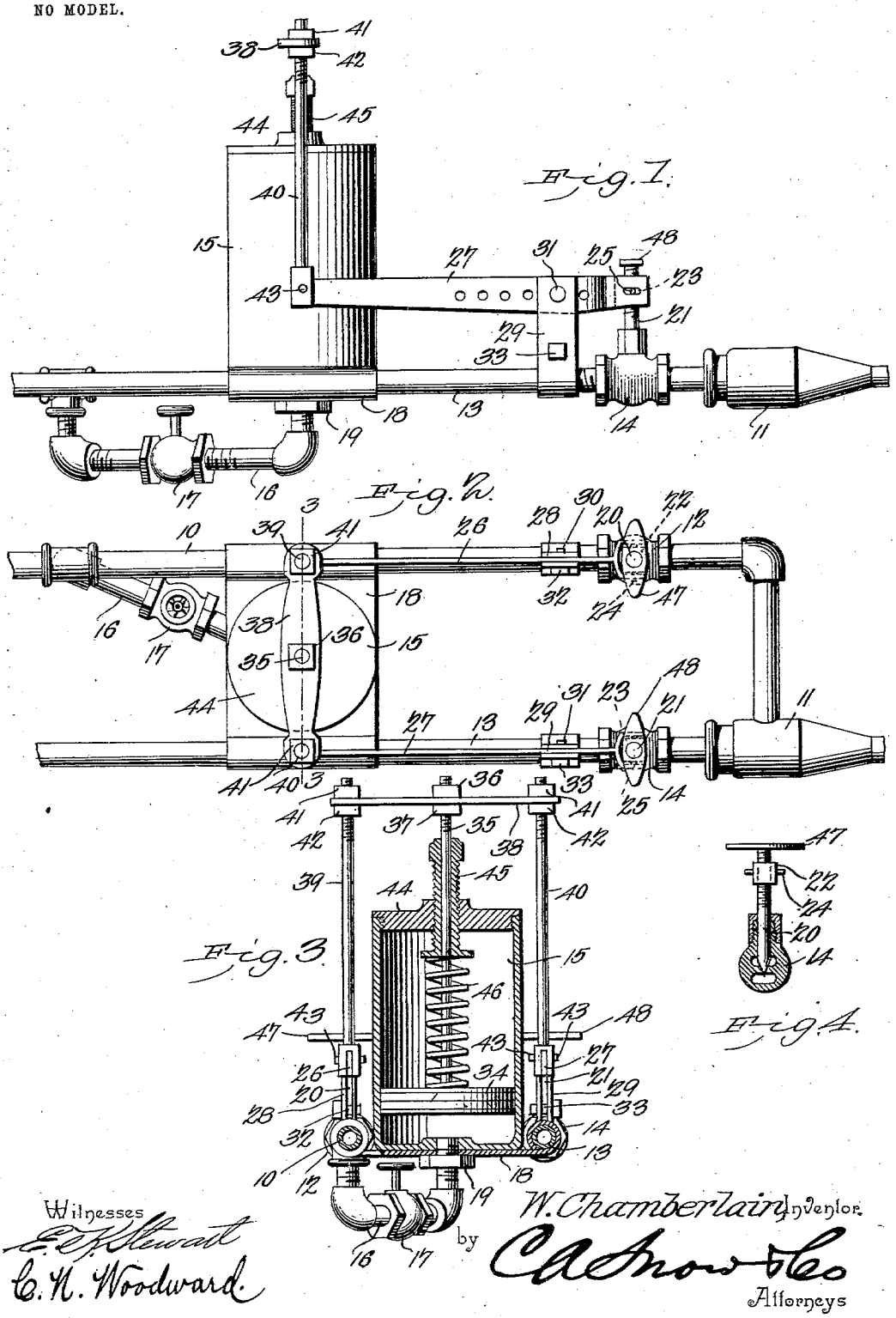

UNITED STATES PATENT OFFICE.

WILLIAM CHAMBERLAIN, OF JENNINGS, LOUISIANA.

OIL-BURNER REGULATOR.

SPECIFICATION forming part of Letters Patent No. 752,200, dated February 16, 1904.

Application filed April 22, 1903. Serial No. 153,818. (No model.)

*To all whom it may concern:*

Be it known that I, WILLIAM CHAMBERLAIN, a citizen of the United States, residing at Jennings, in the parish of Calcasieu and State of Louisiana, have invented a new and useful Oil-Burner Regulator, of which the following is a specification.

This invention relates to hydrocarbon-burners of the class wherein jets of steam are combined with the hydrocarbons and with or without atmospheric air introduced within the burner, and has for its object to simplify and improve devices of this character and produce a device wherein the fuel-supply will be automatically regulated by the pressure of the steam.

The invention consists in certain novel features of the construction, as hereinafter shown and described, and specified in the claims.

In the drawings, in which corresponding parts are denoted by like designating characters, Figure 1 is a side elevation, and Fig. 2 is a plan view of the device complete. Fig. 3 is a transverse section on the line 3 3 of Fig. 2. Fig. 4 is a transverse section through one of the controlling-valves.

The improved device may be operated in connection with any of the various forms of hydrocarbon or liquid-fuel burners in which jets of steam or hot air under pressure are commingled, and I do not, therefore, wish to be limited to the use of the device in connection with any specific form of burner and reserve the right to its use in connection with any apparatus with which it is adapted to be operated.

The improved device consists of a steam-supply means in the form of a conductor-pipe 10, leading to any approved form of burner 11 and provided with a feed-valve 12, preferably of the "needle" order, and a hydrocarbon-feed-supply means in the form of a pipe 13, leading to the burner 11 and also supplied with an independent feed-valve 14 of the needle order.

Supported adjacent to the supply-pipes, preferably between them, as shown, is a cylinder 15, connected at its lower end with the steam-supply pipe 10 by a branch 16 and preferably with a shut-off valve 17, as shown. The cylinder 15 is preferably mounted upon a bracket or base 18, with the branch pipe 16 passing through the bracket and coupled to the cylinder by a screw-collar 19 upon the branch 16 and the ends of the bracket engaging the pipes 10 13, as shown. By this means the bracket not only serves as a support for the cylinder, but likewise as a means for connecting and coupling the pipes and binding the whole together and preventing lateral displacement.

The stems 20 21 of the valves 12 14 are threaded outside their valve-casings and are provided, respectively, with nuts 22 23, the latter movably connected, as by trunnions 24 25 to the yoked ends of lever-arms 26 27, extending to points near the opposite sides of the cylinder 15, as shown. The threaded stems 20 21 will be provided with small turn-knobs or levers 47 48, by which they may be rotated to adjust the valves.

Rising from the pipes 10 13 are standards 28 29, formed to enclasp the pipes and with spaced sides and having transverse apertures by which the levers 26 27 are pivoted thereto by pins 30 31, as shown. The lever-arms are provided with a plurality of spaced apertures for the pins 30 31, and the standards are adjustable longitudinally of the supply-pipes, as by clamp-screws 32 33, so that the fulcrum-points of the levers can be changed to adjust the "throw," if required.

The cylinder 15 is provided with a plunger or piston 34, suitably packed, so that it operates steam-tight in the cylinder, and having a stem 35, extending above the cylinder and threaded upon the upper end and provided with nuts 36 37, whereby a cross-arm 38 is secured adjustably thereto, as shown. The outer ends of the arm 38 are connected to the free ends of the lever-arms 26 27 by rods 39 40, threaded at their upper ends and passing through apertures in the arm, the rods provided with nuts 41 42 upon opposite sides of the arm, whereby the latter may be adjustably connected to the rods. The rods 39 40 are pivotally connected, as at 43, to the lever-arms 26 27, by which arrangement the vertical movement of the plunger will be transmitted to the valve-stems and open and close the valves corresponding to the movement of the plunger, as will be obvious, and these relative movements may be very delicately adjusted and controlled by the numerous adjusting means shown.

The cylinder 15 is closed by a cap 44, through the center of which a screw-plug 45 is tapped, the plug having a longitudinal aperture for the free passage of the stem 35. Between the inner end of the screw-plug and the plunger or piston 34 a spring 46 is supported and exerting its force to produce resistance to the upward movement of the plunger, and the strength of this resistance can be very readily controlled by adjusting the screw-plug 45, as it is obvious the more the spring is compressed the greater will be the resistance to the movement of the plunger.

By these arrangements of parts it is obvious that when the valves 12 14 are properly adjusted and the resistance of the plunger 34 likewise properly adjusted the steam admitted beneath the plunger will maintain the valves at a uniform position and admit the steam and hydrocarbon at a uniform rate, so long as the steam-pressure remains the same. If, however, the steam-pressure increases, the plunger will be elevated, thereby depressing the valves 12 14 through the lever connection, and thus reduce the flow of fuel and correspondingly reducing the pressure by decreasing the heat. Then, on the contrary, the reverse action will take place at any decrease of pressure, as will be obvious.

By the numerous and various adjustments above noted any required size of flame may be secured and automatically maintained at a uniform degree and the steam-pressure likewise uniformly maintained.

The parts are very simple and compact, easily operated, and readily adjustable from the exterior, and will effectually and efficiently produce the desired results. The fuel will be used with great economy, as no waste can occur, as the fire can be automatically maintained at any required degree and quickly reduced or increased in intensity.

The device can be manufactured in any size and of any required material.

Having thus described the invention, what I claim is—

1. An oil-burner regulator comprising a steam-supply pipe, an oil-supply pipe, a burner to which both pipes are connected, a cylinder, a branch pipe leading from the steam-pipe to the cylinder, a plunger in the cylinder, a plunger-rod, a spring tending to retard movement of the plunger under the pressure of the steam, valves in the two pipes, standards carried by the pipes, levers, pivotally mounted on said standards and connected each at one end to one of the valves, and an adjustable connecting means between the opposite ends of the levers and the plunger-rod.

2. An oil-burner regulator comprising a steam-supply pipe, an oil-supply pipe, a burner to which both pipes are connected, valves disposed in the pipes, a cylinder carried by the pipes, a branch steam-pipe connecting the main steam-pipe to the cylinder, a plunger-rod, an adjustable perforated plug carried by the head of the cylinder and encircling the rod, a spring disposed between said plug and the plunger, a cross-bar carried by the plunger-rod and adjustable thereon, standards carried by the pipes and adjustable thereon, levers pivoted to the standards and connected at one end to the valves, and adjustable rods connecting the opposite ends of said levers to the cross-bar.

3. In a device of the character described, a steam-supply pipe and a liquid-fuel-supply pipe spaced apart and provided with independent feed-valves, a bracket having an aperture and connecting said pipes, a cylinder supported upon said bracket and connected to said steam-supply pipe by a branch leading through said aperture and connected to said cylinder, a plunger in said cylinder, and connecting means between said plunger and valves whereby the movements of said plunger control said valves, substantially as specified.

In testimony that I claim the foregoing as my own I have hereto affixed my signature in the presence of two witnesses.

WILLIAM CHAMBERLAIN.

Witnesses:
N. L. MILLER,
GEO. W. COULSON.